(12) United States Patent
Yamashita et al.

(10) Patent No.: US 6,675,876 B2
(45) Date of Patent: Jan. 13, 2004

(54) ROTARY COOLING ROLLER

(75) Inventors: Kinya Yamashita, Osaka (JP); Tyuichi Itashiki, Osaka (JP); Tomohiro Motomura, Osaka (JP); Kunihiko Minami, Osaka (JP); Iwao Sawada, Osaka (JP)

(73) Assignee: Sasakura Engineering Co., Ltd., Osaka (JP)

( * ) Notice: Subject to any disclaimer, the term of this patent is extended or adjusted under 35 U.S.C. 154(b) by 545 days.

(21) Appl. No.: 09/725,480

(22) Filed: Nov. 30, 2000

(65) Prior Publication Data

US 2003/0029603 A1 Feb. 13, 2003

(30) Foreign Application Priority Data

Dec. 1, 1999 (JP) ............................. 11-341983

(51) Int. Cl.[7] .............................................. F28D 11/02
(52) U.S. Cl. ............................ 165/89; 165/90; 492/44; 492/46; 34/119; 34/124
(58) Field of Search ................ 165/89, 90; 492/44, 492/46; 34/119, 124

(56) References Cited

U.S. PATENT DOCUMENTS

| | | | | |
|---|---|---|---|---|
| 2,068,779 A | * | 1/1937 | Tunley et al. | 165/89 |
| 2,367,578 A | * | 1/1945 | Helin | 165/89 |
| 2,793,006 A | | 5/1957 | Eaby | 257/95 |
| 2,956,348 A | * | 10/1960 | Mueller | 165/89 |
| 3,752,227 A | | 8/1973 | Bulson | 165/89 |
| 4,252,184 A | * | 2/1981 | Appel | 165/89 |
| 4,913,224 A | * | 4/1990 | Moran | 165/89 |
| 5,179,770 A | * | 1/1993 | Block et al. | 165/90 |
| 5,484,370 A | | 1/1996 | Jenke et al. | 492/4 |

FOREIGN PATENT DOCUMENTS

| | | | | |
|---|---|---|---|---|
| CA | 734294 | * | 5/1966 | 165/90 |
| DE | 618742 | * | 9/1935 | 165/90 |
| GB | 193479 | * | 2/1923 | 165/90 |
| JP | 60-151023 | | 8/1985 | |
| JP | 2-40497 | * | 2/1990 | 165/89 |
| JP | 4-98092 | * | 3/1992 | 165/89 |

OTHER PUBLICATIONS

Patent Abstracts of Japan vol. 009, No. 316 (M–438), Dec. 12, 1985—& JP 60 151023 A (TORAY KK), Aug. 8, 1985.

* cited by examiner

*Primary Examiner*—Christopher Atkinson
(74) *Attorney, Agent, or Firm*—Michael D. Bednarek; Shaw Pittman LLP

(57) ABSTRACT

A rotary cooling roller includes outer and inner cylinders, two end plates fixed to both ends of the outer cylinder, and a supporting shaft protruding from the end plates. A cylindrical space, provided between the outer and the inner cylinders, communicates with the inner space of the inner cylinder via through-holes formed in the inner cylinder. A coolant contained is allowed to flow back and forth between the cylindrical space and the inner space of the inner cylinder. Ring-shaped spacers are provided in the cylindrical space for passing an external force exerted on the outer cylinder to the inner cylinder.

10 Claims, 4 Drawing Sheets

ROTARY COOLING ROLLER

BACKGROUND OF THE INVENTION

1. Field of the Invention

The present invention relates to a rotary cooling roller used for e.g. sheet producing apparatus, sheet processing apparatus or sheet laminating apparatus.

2. Description of the Related Art

A conventional rotary cooling roller is disclosed in JP-A-63 (1988)-282393 for example. The conventional roller is incorporated in a film-laminating apparatus in which a thin film of synthetic resin is laminated on elongated, continuous paper (base paper). The laminated resin film and the base paper are squeezed between the cooling roller and a presser roller facing the cooling roller. Thus, the resin film, cooled by the cooling roller, is fixed to the base paper, thereby providing product laminate paper coated with the resin film.

The conventional cooling roller includes a cylindrical body, two circular end plates fixed to both ends of the cylindrical body, and a plurality of cooling tubes arranged inside of the cylindrical body. Each of the end plates is provided with a supporting shaft protruding outward from the center of the end plate. The cooling roller is rotatably supported, via these supporting shafts, by a fixing member. Inside of the cylindrical body is contained a volatile working fluid for cooling the surface of the cylindrical body. Each of the cooling tubes is designed to pass cooling water for cooling the evaporated working fluid.

In operation, the facing presser roller is pressed against the cooling roller, thereby exerting a rather great pressing force (about 2–10 kg/mm) on the cooling roller. The pressing force necessary to laminate the resin film on the base paper depends upon e.g. the kind of laminate paper to be produced and/or production speed of the laminate paper. Specifically, a greater pressing force is needed, for example when a flatter surface is desired in the resulting laminate paper, or when a faster production speed is desired. In the latter case, the pressing force needs to be increased because it is necessary to prevent air from being trapped between the laminated resin film and the base paper.

The conventional cooling roller has been found disadvantageous in the following points.

As stated above, the cooling roller is supported via the supporting shafts protruding from the ends plates of the roller. Since these two supporting shafts are widely spaced in the longitudinal direction of the roller, the cooling roller as a whole tends to be arched upon receiving a pressing force exerted by the presser roller. In addition, since the conventional cooling roller is not provided with any reinforcing member, the surface of the cooling roller may be partially dented when the presser roller is forcibly pressed against the cooling roller. Under these adverse circumstances, the resulting laminate paper may often suffer a defect such as incomplete adhesion of the resin film to the base paper. This situation will be aggravated when the length and/or diameter of the cooling roller is rendered greater.

The above problem may be addressed by increasing the thickness of the cylindrical body. Specifically, supposing that the cylindrical body is made of steel and has an outer diameter of 900 mm and a length of 3000 mm, the wall thickness of the cylindrical body may need to be about 18 mm for a pressing force of 2 kg/mm or 32 mm for a pressing force of 7 kg/mm.

However, a greater thickness of the cylindrical body is disadvantageous in facilitating the heat conduction from the outer surface to the inner surface of the cylindrical body. For instance, in order to lower the temperature of the cylindrical body by 1° C. per unit wall thickness (1 mm), the temperature difference between the outer and the inner surfaces of the cylindrical body may need to be 18° C. for the wall thickness of 18 mm and 32° C. for the wall thickness of 32 mm. This means that a thicker cylindrical body needs a colder coolant to be held in contact with the inner surface so that the temperature of the resin film is lowered by a given amount. Disadvantageously, the preparation of such a colder coolant may lead to an increase in production cost.

To avoid such a cost increase, the operating speed of the sheet laminating apparatus may be slowed down, so that the heat conduction from the resin film to the cylindrical body can be performed over a sufficiently long period of time. Disadvantageously, however, this alternative compromises the production efficiency.

SUMMARY OF THE INVENTION

The present invention has been proposed under the circumstances described above, and its object is to provide a cooling roller boasting a sufficient mechanical strength as well as good thermal conductivity.

According to the present invention, there is provided a rotary cooling roller which includes an outer cylinder having first and second ends, first and second end plates for respectively closing the first and the second ends of the outer cylinder, a supporting shaft protruding outward from a center of each end plate, volatile working fluid contained in the outer cylinder, cooling tubes for passing a coolant, an inner cylinder arranged in the outer cylinder to surround the cooling tubes and having first and second ends connected to either of the end plates and the supporting shaft, a cylindrical space defined between an outer surface of the inner cylinder and an inner surface of the outer cylinder, and a spacer arranged in the cylindrical space so that a pressing force exerted on the outer cylinder and directed toward the supporting shaft is passed to the inner cylinder. The inner cylinder is formed with a plurality of through-holes for causing the cylindrical space to communicate with an inner space of the inner cylinder.

With such an arrangement, the inner cylinder can mechanically support the outer cylinder upon which an external force is exerted. Thus, the thickness of the outer cylinder does not need to be unduly great, which is advantageous to facilitating the heat conduction from a warmer sheet object (such as extruded resin film) to the outer cylinder.

Preferably, the cooling roller may further include a circular reinforcing plate arranged at a predetermined location in an axial direction of the inner cylinder. The reinforcing plate may have a circumferential surface held in contact with an inner surface of the inner cylinder. The reinforcing plate may be fixed to the supporting shaft. Alternatively, the reinforcing plate may be spaced from the supporting shaft.

In a preferred embodiment of the present invention, the spacer may extend circumferentially of the inner cylinder.

Preferably, the spacer may be formed with a cutout to allow the working fluid to flow back and forth between two opposite sides of the spacer. The cutout may be a through-hole extending through the spacer.

Preferably, the cooling roller may further include a first coolant chamber adjacent to the first end plate and a second coolant chamber adjacent to the second end plate. In this case, the supporting shaft extends through the first and the second coolant chambers.

Preferably, the supporting shaft may be provided with a coolant inlet passage and a coolant outlet passage which communicate with the first and the second coolant chambers, respectively, via through-holes formed in the supporting shaft.

Preferably, the outer cylinder may be smaller in thickness but greater in length than the inner cylinder.

Other features and advantages of the present invention will become apparent from the detailed description given below with reference to the accompanying drawings.

DETAILED DESCRIPTION OF THE PREFERRED EMBODIMENTS

The preferred embodiment of the present invention will be described below with reference to the accompanying drawings.

Figure 1:
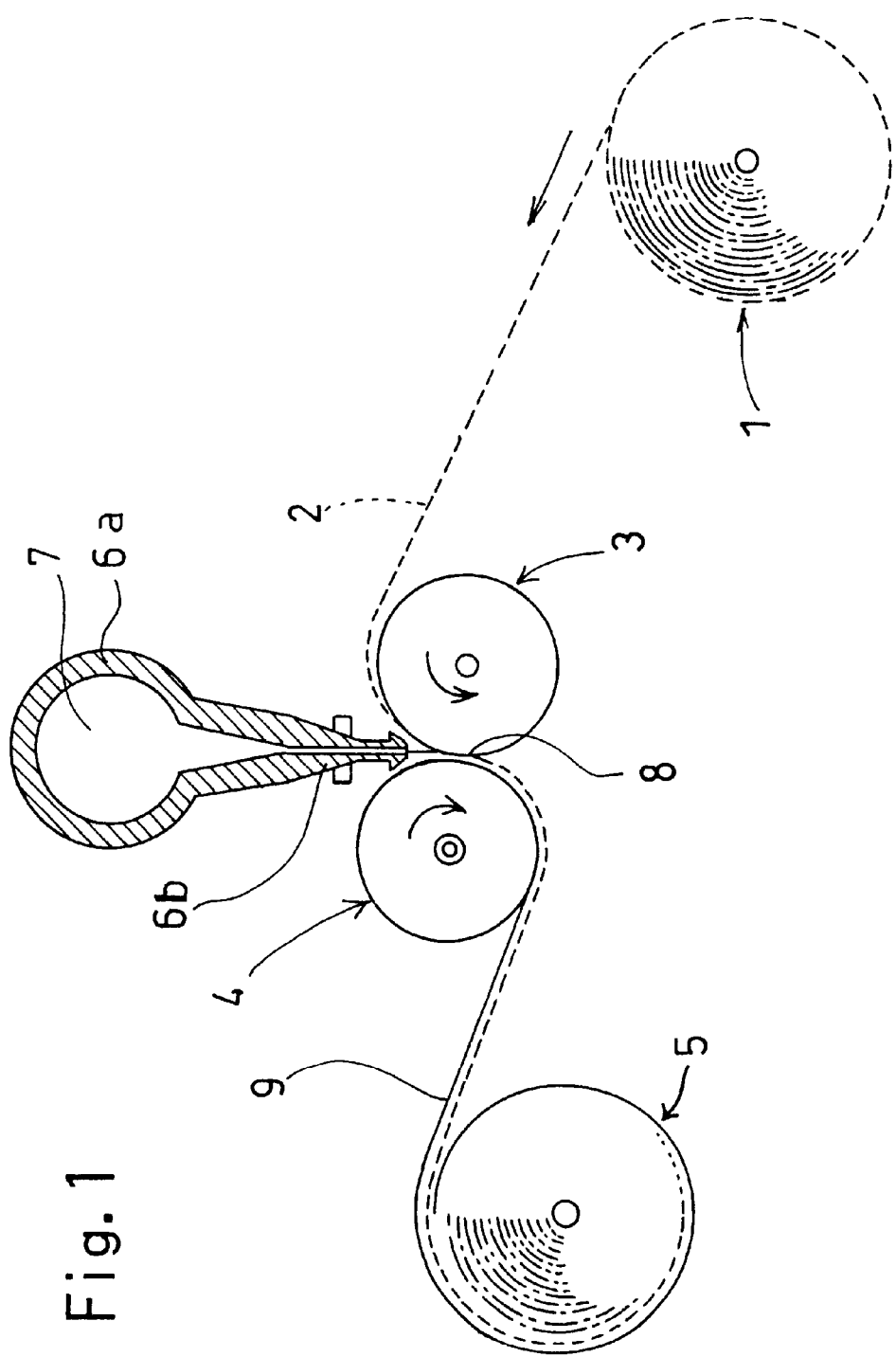
FIG. 1 is a side view schematically showing the principal components of a sheet laminating apparatus including a rotary cooling roller embodying the present invention.

Reference is first made to FIG. 1 illustrating the principal components of a sheet laminating apparatus incorporating a cooling roller embodying the present invention. As shown, the laminating apparatus includes a paper roll 1 from which continuous paper 2 (called "material paper" below) is paid out. The laminating apparatus also includes a rotatable presser roller 3 and a rotatable cooling roller 4 facing the presser roller 3. After being paid out from the paper roll 1, the material paper 2 is nipped between the presser roller 3 and the cooling roller 4. In FIG. 1, the presser roller 3 is caused to rotate counterclockwise while the cooling roller 4 clockwise, thereby frictionally advancing the material paper 2.

The laminating apparatus further includes a resin holder 6a arranged above the two facing rollers 3 and 4. The resin holder 6a contains molten, synthetic resin material 7. An extrusion die 6b is attached to the lower portion of the resin holder 6a, so that the molten resin 7 as being extruded is shaped into a film. The extruded resin film 8 is brought into pressing contact with the material paper 2 by the presser roller 3 and the cooling roller 4. At this stage, the resin film 8 is cooled by the cooling roller 4 to be attached to the material paper 2. Thus, resin-coated, laminate paper 9 is obtained. As illustrated, this laminate paper 9 is wrapped around itself as a laminate paper roll 5.

According to the present invention, the cooling roller 4 has several advantages over the conventional cooling roller described hereinbefore.

Figure 2:
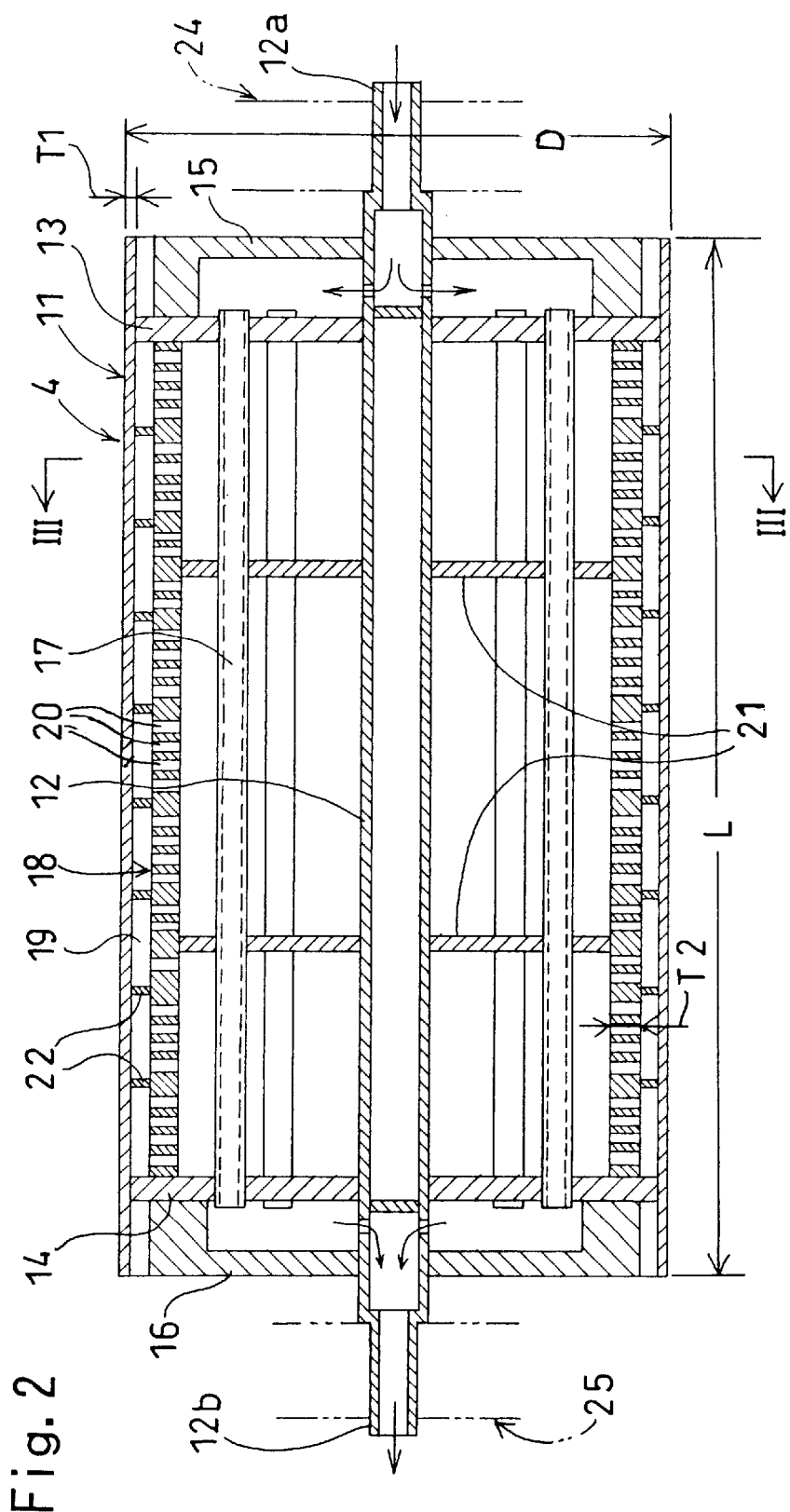
FIG. 2 is a sectional view showing the cooling roller shown in FIG. 1.
Figure 3:
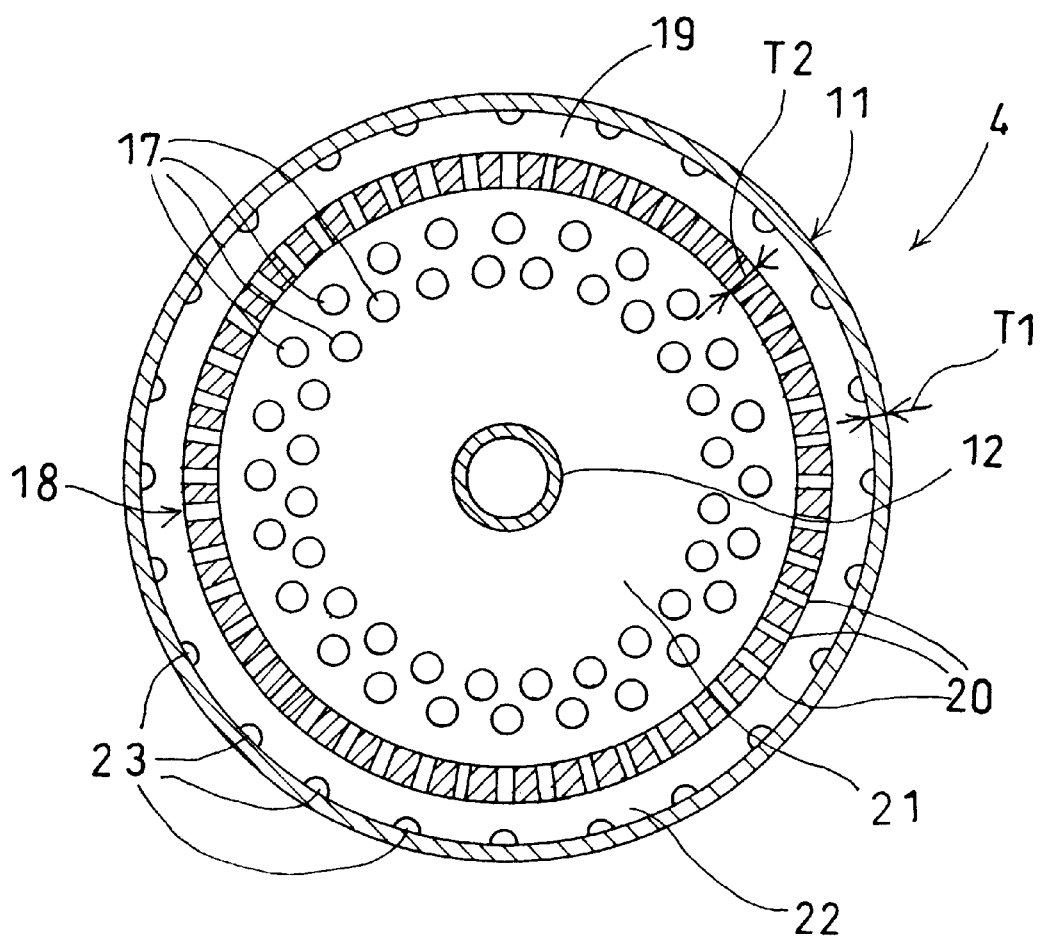
FIG. 3 is a sectional view taken along lines III—III in FIG. 2.
Figure 4:
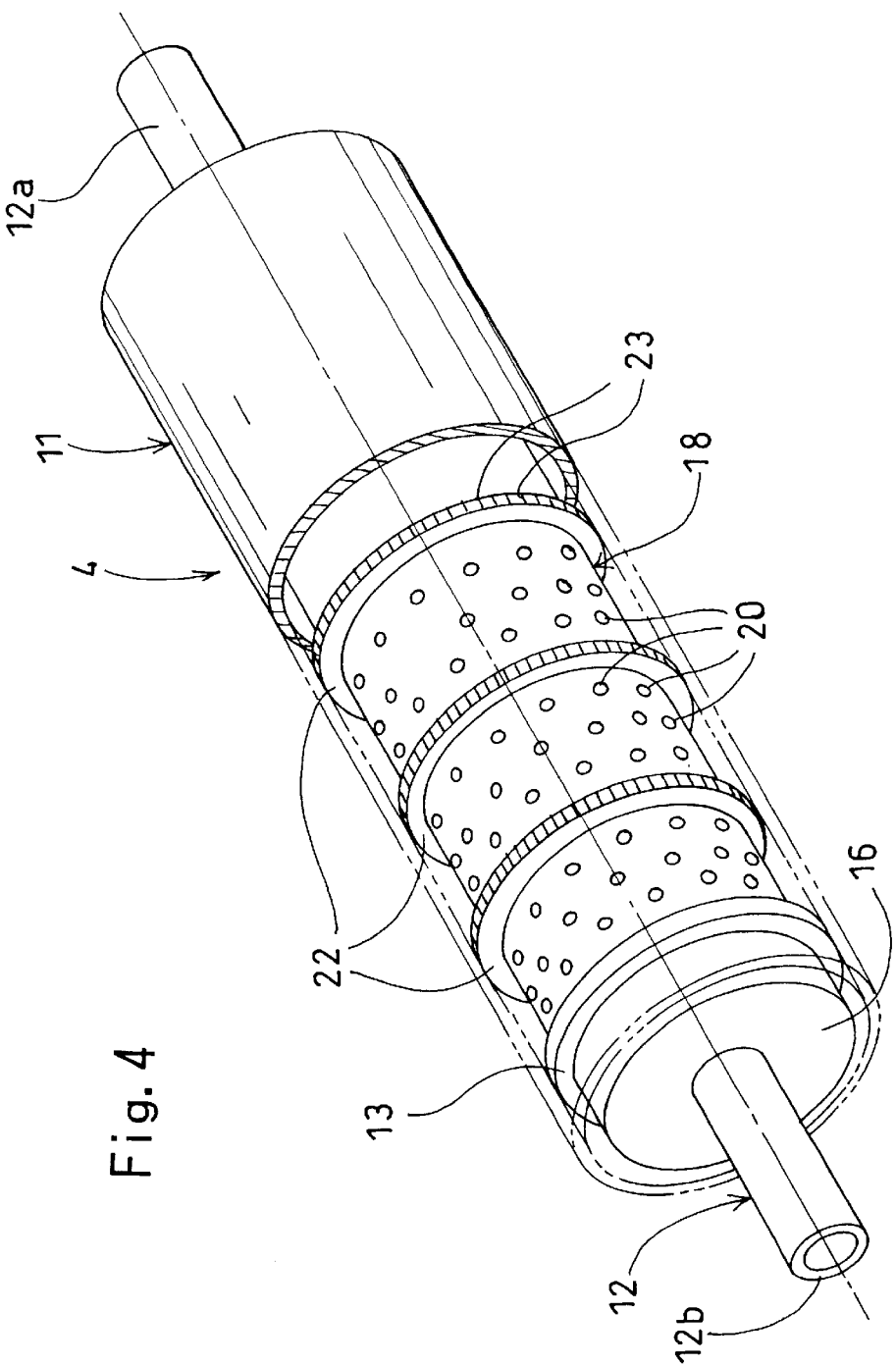
FIG. 4 is a perspective view showing the cooling roller of FIG. 2.

Specifically, referring to FIGS. 2–4, the cooling roller 4 of the present invention includes an outer cooling cylinder 11 and a hollow, supporting shaft 12. The cooling cylinder 11 has a predetermined small thickness T1, an outer diameter D and a length L. The cylinder 11 is fixed to the shaft 12 via first and second circular plates 13, 14 arranged inside of the cylinder 11. As shown in FIG. 2, the two parallel circular plates 13 and 14 are spaced from each other in the longitudinal direction of the shaft 12. The shaft 12 extends through the centers of the respective plates 13, 14. The shaft 12 has a first and a second ends 12a, 12b protruding outward from the cooling cylinder 11. The first and the second ends 12a, 12b are supported by a non-illustrated stationary frame of the laminating apparatus via bearings 24, 25.

The cooling roller 4 is provided with first and second water chambers 15, 16. As shown in FIG. 2, the first water chamber 15 is disposed outward of and adjacent to the first circular plate 13, while the second water chamber 16 is disposed outward of and adjacent to the second circular plate 14. The first and the second water chambers 15, 16 communicate with each other via a plurality of cooling tubes 17 extending in parallel to the supporting shaft 12. Each of the cooling tubes 17 penetrates, at its both ends, through the first and the second circular plates 13, 14 into the first and the second water chambers 15, 16. As shown in FIG. 3, the cooling tubes 17 are arranged in two-fold circles around the supporting shaft 12.

Referring back to FIG. 2, cooling water is first supplied to the first water chamber 15 via the inner water passage in the first end 12a of the shaft 12. To this end, a plurality of through-holes are formed in the shaft wall for causing the inner water passage to communicate with the first water chamber 15. The water supplied to the first water chamber 15 will then flow through the respective cooling tubes 17, to be supplied to the second water chamber 16. Thereafter, the water is discharged from the cooling roller 4 via the inner water passage in the second end 12b of the shaft 12.

The cooling roller 4 is further provided with an inner cylinder 18 arranged inside of the outer cylinder 11. As shown in FIG. 2, the inner cylinder 18, which is shorter than the outer cylinder 11, is fixed to the first and the second circular plates 13, 14. The inner cylinder 18 has a predetermined thickness T2 which is greater than the thickness T1 of the outer cylinder 11. As shown in FIGS. 2 and 3, the inner cylinder 18 surrounds the cooling tubes 17. To maintain the original shape of the inner cylinder 18, a plurality of (in the illustrated example, two) circular reinforcing plates 21 are provided inside of the inner cylinder 18. The supporting shaft 12 and the cooling tubes 17 extend through the respective reinforcing plates 21. In this manner, the original parallel relation between the cooling tubes 17 and the supporting shaft 12 is maintained.

In the illustrated example, the inner diameter of each reinforcing plate 21 is equal to (or slightly smaller than) the outer diameter of the supporting shaft 12, so that the plate 21 is snugly supported by the shaft 21. Alternatively, each plate 21 may be spaced from the shaft 12 by increasing the inner diameter of the plate 21. In this case, however, the outer diameter of each plate 21 should remain unchanged. Also, the increased inner diameter is sufficiently small, so that the intermediate positioning of each cooling tube 17 by the plate 21 is still provided.

The outer diameter of the inner cylinder 18 is smaller than the inner diameter of the outer cylinder 11. Thus, a cylindrical space 19 is provided between the outer and the inner cylinders 11, 18. To maintain the space 19, a plurality of ring-shaped spacers 22 are disposed between the outer and the inner cylinders 11, 18. The spacers 22 are arranged at regular intervals in the longitudinal direction of the shaft 12. Thus, the spacers 22 divide the cylindrical space 19 into several subspaces. It should be noted here that, as shown in FIG. 3, each spacer 22 is formed with a plurality of cutouts 23 arranged circumferentially of the spacer 22, thereby allowing the respective subspaces to communicate with each other.

As shown in FIGS. 2 and 4, the inner cylinder 18 is formed with a plurality of through-holes 20 for allowing the cylindrical space 19 to communicate with the inner space of the inner cylinder 18.

As a coolant, a volatile working fluid is contained in the inner space of the inner cylinder 18. The working fluid may contain naphthalene or quinoline for example.

In operation, when the extruded resin film 8 and the base paper 2 are pressed together between the presser roller 3 and the cooling roller 8 (see FIG. 1), heat is conducted from the resin film 8 to the outer cylinder 11 of the cooling roller 4 (meaning that the resin film 8 is cooled), thereby heating up the cylinder 11. Then, the warmed-up cylinder 11 in turn heats up the working fluid present in the cylindrical space 19. As a result, the working fluid is evaporated. Then, the gas of the working fluid is introduced into the inner space of the inner cylinder 18 via the through-holes 20. There, the gas comes into contact with the cooling tubes 17, to be cooled down and condensed. Then, the condensed fluid will flow back to the cylindrical space 19 via the through-holes 20. Thus, the colder working fluid will absorb heat from the extruded resin film 8, and the above-stated process will be repeated.

According to the present invention, the outer cylinder 11 is mechanically reinforced by the inner cylinder 18 via the regularly arranged spacers 22. In addition, the inner cylinder 18 itself is reinforced by the circular plates 21. Thus, even with a relatively small wall thickness (10 mm for example), which is advantageous to facilitating the heat conduction, the outer cylinder 11 can withstand a strong pressing force exerted by the presser roller 3, substantially without being partially dented or warped as a whole.

According to the present invention, each of the spacers 22 may be prepared separately of the inner and the outer cylinders 18, 11. These spacers 22 may be welded to the outer surface of the inner cylinder 18 or to the inner surface of the outer cylinder 11. Alternatively, the spacers 22 may be formed integral with the inner or outer cylinder. Such a spacer may be formed by mechanically processing the inner or outer surface of a cylindrical member having an appropriately great thickness.

In the illustrated example, each spacer 22 is ring-shaped, though the present invention is not limited to this. For instance, each spacer 22 may have a straight bar-like configuration, extending in the longitudinal direction of the inner cylinder 18. Further, the plurality of spacers 22 may be replaced by a single, helical member twined around the inner cylinder 18, or by a plurality of stubs arranged at regular intervals circumferentially and longitudinally of the inner cylinder 18. Each of the stubs may be welded to the outer surface of the inner cylinder 18 or to the inner surface of the outer cylinder 11.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A rotary cooling roller comprising:

an outer cylinder having first and second ends;

first and second end plates for respectively closing the first and the second ends of the outer cylinder;

a supporting shaft protruding outward from a center of each end plate;

volatile working fluid contained in the outer cylinder;

cooling tubes for passing a coolant;

an inner cylinder arranged in the outer cylinder to surround the cooling tubes and having first and second ends connected to either of the end plates and the supporting shaft;

a cylindrical space defined between an outer surface of the inner cylinder and an inner surface of the outer cylinder; and a spacer arranged in the cylindrical space so that a pressing force exerted on the outer cylinder and directed toward the supporting shaft is passed to the inner cylinder;

wherein the inner cylinder is formed with a plurality of through-holes for causing the cylindrical space to communicate with an inner space of the inner cylinder.

2. The roller according to claim 1, further comprising a circular reinforcing plate arranged at a predetermined location in an axial direction of the inner cylinder, the reinforcing plate having a circumferential surface held in contact with an inner surface of the inner cylinder.

3. The roller according to claim 1, wherein the spacer extends circumferentially of the inner cylinder.

4. The roller according to claim 3, wherein the spacer is formed with a cutout to allow the working fluid to flow back and forth between two opposite sides of the spacer.

5. The roller according to claim 1, further comprising a first coolant chamber adjacent to the first end plate and a second coolant chamber adjacent to the second end plate, the supporting shaft extending through the first and the second coolant chambers.

6. The roller according to claim 5, wherein the supporting shaft is provided with a coolant inlet passage and a coolant outlet passage which communicate with the first and the second coolant chambers, respectively, via through-holes formed in the supporting shaft.

7. The roller according to claim 2, wherein the reinforcing plate is fixed to the supporting shaft.

8. The roller according to claim 2, wherein the cooling tubes penetrate through the reinforcing plate.

9. The roller according to claim 1, wherein the outer cylinder is smaller in thickness but greater in length than the inner cylinder.

10. The roller according to claim 1, wherein the supporting shaft extends through each end plate.

* * * * *